United States Patent
Sturies et al.

[11] Patent Number: 5,954,300
[45] Date of Patent: Sep. 21, 1999

[54] HOLDING ELEMENT FOR FASTENING AT LEAST ONE TUBULAR COMPONENT ON A CARRIER

[75] Inventors: Jens Sturies, Lenting; Dieter Mauer, Lollar, both of Germany

[73] Assignee: Emhart Inc., Newark, Del.

[21] Appl. No.: 08/752,015

[22] Filed: Oct. 24, 1996

[30] Foreign Application Priority Data

Oct. 27, 1995 [DE] Germany .......................... 195 40 168

[51] Int. Cl.⁶ .................................................. F16L 3/22
[52] U.S. Cl. ....................................... 248/68.1; 248/68.2
[58] Field of Search ................................. 248/68.1, 67.7, 248/68.2, 74.3, 74.2

[56] References Cited

U.S. PATENT DOCUMENTS

| | | |
|---|---|---|
| 3,065,941 | 11/1962 | Loftis . |
| 4,669,156 | 6/1987 | Guido et al. ............................ 248/74.3 |
| 4,840,333 | 6/1989 | Nakayama ............................ 248/68.1 |
| 4,881,705 | 11/1989 | Kraus ..................................... 248/74.2 |
| 5,184,794 | 2/1993 | Saito ...................................... 248/68.1 |
| 5,257,768 | 11/1993 | Juenemann et al. ..................... 248/604 |
| 5,588,683 | 12/1996 | Schliessner ............................ 248/74.2 |

FOREIGN PATENT DOCUMENTS

| | | |
|---|---|---|
| 0483636 | 5/1992 | European Pat. Off. . |
| 0506307 | 9/1992 | European Pat. Off. . |
| 0612944 | 8/1994 | European Pat. Off. . |
| 0638756 | 2/1995 | European Pat. Off. . |
| 3708864 | 9/1988 | Germany . |

*Primary Examiner*—Leslie A. Braun
*Assistant Examiner*—Kimberly T. Wood
*Attorney, Agent, or Firm*—Edward D. Murphy

[57] ABSTRACT

A holding element comprising a base part (1) for arrangement on a carrier, a support member (2) for a component (4) and a damping element (3) is proposed for fastening at least one tubular component on a carrier. The base part and the holding part are connected to one another by at least on flexible web (5, 6), the damping element (3) being arranged between the base part (1) and the support member (2). The damping element surrounds the web (5, 6) completely as viewed in the circumferential direction of the web (5, 6).

21 Claims, 2 Drawing Sheets

HOLDING ELEMENT FOR FASTENING AT LEAST ONE TUBULAR COMPONENT ON A CARRIER

BACKGROUND OF THE INVENTION

The invention relates to a holding element, in particular for fastening at least one tubular component on a carrier.

DESCRIPTION OF THE PRIOR ART

A plastic holding element, in particular for fastening at least one tube on a carrier, is known from DE 37 08 864 C2. The known holding element has a bearing region for a tubular component and a holding region for application to a carrier. Such holding elements are used, for example, for the laying of fuel or brake lines in motor vehicles. To prevent vibrations, in particular noises, from being transmitted by the holding element from the tubular component to the carrier or vice versa, the holding element known from DE 37 08 864 C2 has an insert made of a material which is softer than the plastic of the retaining member. The insert is formed in the bearing region of the holding element, the insert being connected to a face of the bearing region via at least one linking element by the two-component injection molding process. The insert is in direct contact with the tubular components. It is known from DE 37 08 864 C2 to form the entire bearing region from a material which is softer than the plastic of the retaining member. With such a design of the holding element, an additional cover is required as the holding force applied by the insert on a tubular component is too small to ensure that the tubular component is held by the holding element.

Furthermore, a plastic holding element with at least one bearing region arranged next to a holding region for receiving at least one tubular part is known from EP 0 483 636 B1. The holding element is constructed in three parts. It has a first part of rigid material comprising the bearing region. A second part of soft damping material is inserted in the first part. A third part which is inserted through a continuous orifice in the second part is provided to fasten the holding element on a carrier. The third part consists of a rigid material. The second part, consisting of soft damping material, serves to dampen vibrations, so they are not transmitted to the carrier. This part simultaneously forms the mechanical connection between the first part forming the bearing region and the third part comprising the holding region.

SUMMARY OF THE INVENTION

The object of the present invention is to provide a mechanically stable holding element which disconnects a component from a carrier in terms of vibrations. A method of producing a holding element is also to be provided, by means of which the holding element can be produced in a simple manner. A further object of the invention is to provide a way of simplifying assembly of the holding elements.

The holding element according to the invention, in particular for fastening at least one tubular component on a carrier, which is mechanically stable and disconnects a component from the carrier in terms of vibrations is distinguished by a base part for mounting on a carrier, a support member for a component and a damping element. The base part and the support member are connected to one another by at least one flexible web. The connection of the base part to the support member by means of at least one flexible web produces a mechanically stable holding element as the mechanical stresses, for example in the form of tensile stresses, occurring in at least one tubular component arranged in the support member are transmitted into the support member by the flexible web. The damping of noise and therefore the disconnection in terms of vibrations between the support member and the base part are achieved by means of a damping element arranged between the base part and the support part. The damping element is connected to at least one web. In contrast to the known holding element, the damping element does not serve to produce a mechanical connection between the support member and the base part but merely to dampen vibrations. The mechanical stressing of the damping element is therefore reduced.

A design of a holding element in which the damping element is positively connected to at least one web is preferred. The positive connection between the damping element and at least one web increases the diversity of materials from which the damping element and the support member as well as the base part can be produced since compatibility between the materials, as required with a two-component injection molding process, is unnecessary.

According to a further advantageous idea, it is proposed that the holding element be designed in such a way that the damping element completely surrounds at least one web, as viewed in the circumferential direction of the web. A captive connection between the damping element and at least one web is created by this design. The damping element preferably consists of a soft resilient plastics material. The plastics materials is preferably TPE.

A design of the holding element in which the base part and the support member are connected by at least one obliquely extending web is preferred. Assembly tolerances and production tolerances can be compensated by obliquely extending webs. A further advantage of obliquely extending webs is that vibrations of the component and therefore of the support member can be absorbed better by the damping element. Webs which are V-shaped in design are preferred.

For secure fastening of a tubular component on the base part and for the secure fastening of the holding element on the carrier, the base part and the support member consist of a plastics materials which is harder than that of the damping element. The plastics materials can be, for example, POM.

For simple production of the holding element, the base part, the support member or the web or webs are integral in design.

For producing a holding element with a base part for application on a carrier, a support member for a component and with a damping element, a method is proposed in which the base part, the support member and at least one flexible web connecting the base part and the support member are initially produced in one operation, in particular in a first injection molding operation. The damping element is then placed between the base part and the support member, in particular in a second injection molding operation, the damping element simultaneously being connected to at least one web.

For the automated application of such holding elements on a carrier, a holding element belt is proposed which has several holding elements arranged with mutual spacing between two substantially parallel strips. Each of the holding elements has a base part for application on a carrier, a support member for a component and a damping element. The base part and the support member are connected to one another by at least one flexible web, the damping element being arranged between the base part and the support member and being connected to at least one web. The connection between the strips is preferably produced by the base part of each holding element. To simplify the positioning of each holding element in a mounting tool, each holding element belt preferably has guide elements. The guide element is preferably connected to a base part of a holding element. The guide element can be formed simultaneously with production of the base part.

Further advantages and designs of the holding elements and holding element belts according to the invention are described with reference to an embodiment illustrated in the drawings.

DESCRIPTION OF THE PREFERRED EMBODIMENT

Figure 1:
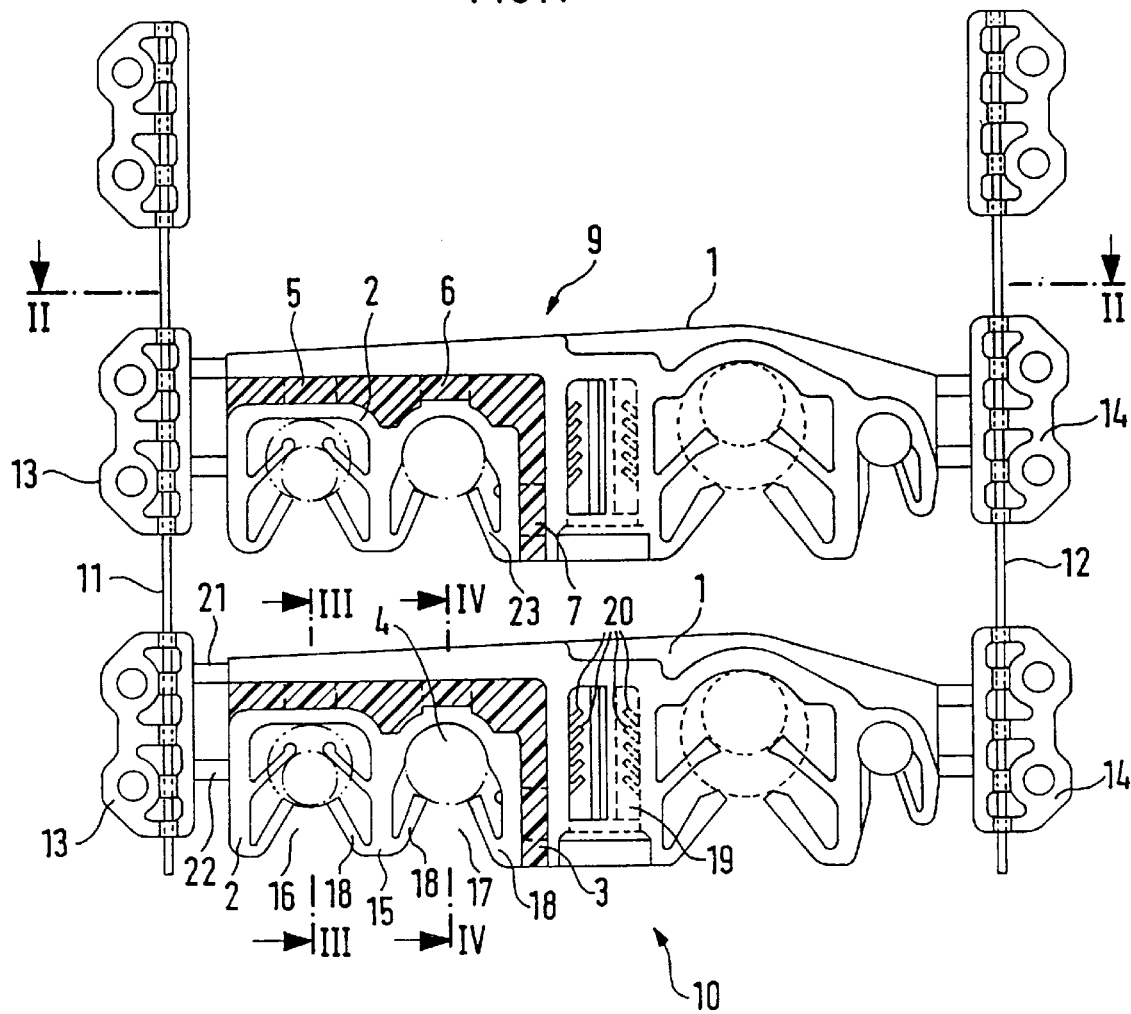
FIG. 1 is a front view of a portion of a holding element belt with holding elements.
Figure 2:
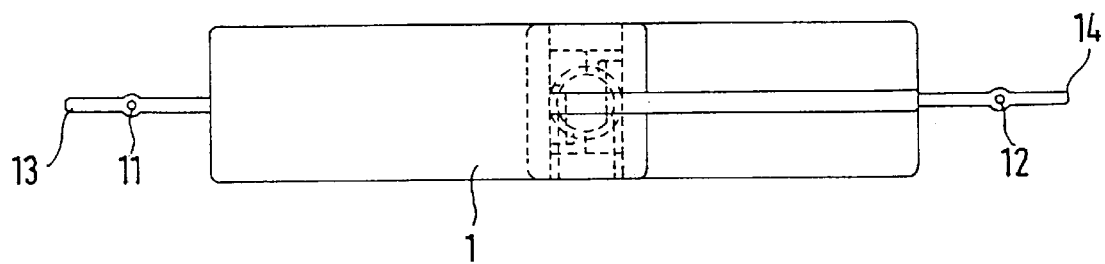
FIG. 2 is an elevation along section line II—II according to FIG. 1.

FIG. 1 shows a holding element belt of the type which can be used for the automated mounting of the holding elements 9, 10. The holding element belt comprises several holding elements 9, 10 which are arranged with mutual spacing between two substantially parallel strips 11, 12. Each holding element 9, 10 has a base part 1 for application on a carrier (not shown). The holding element 9, 10 also has a support member 2 which is suitable for receiving at least one tubular component. The support member 2 has two adjacent U-shaped receivers 16, 17 which are separated by a partition wall 15. Catch projections 18 extending obliquely inwardly from the lateral walls project into each receiver 16, 17 and secure in the receiver a component 4 arranged in the receiver 16 or 17.

A damping element 3 is provided between the base part 1 and the support member 2, the damping element consisting of a soft resilient material.

Figure 3:
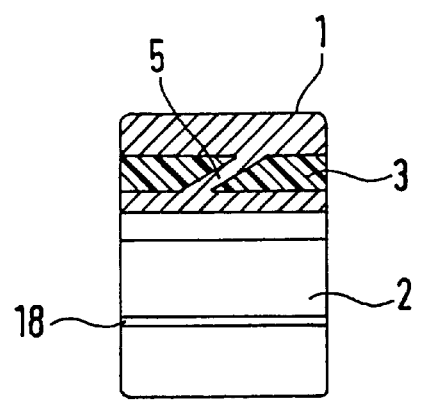
FIG. 3 is a view from the left along section line III—III.
Figure 4:
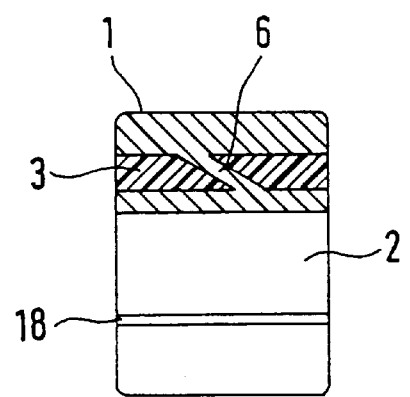
FIG. 4 is a side view from the left along section line IV—IV in FIG. 1.

As shown, in particular, in FIGS. 3 and 4, the base part 1 is connected to the support member 2 by flexible webs 5, 6. The webs 5, 6 are surrounded by the damping element 3. Each web 5, 6 extends obliquely between the base part 1 and the support member 2. The webs 5, 6 are orientated in opposite directions. A further web 7 is provided on the arm 23 of the holding part next to the webs 5, 7 which are formed next to one another.

Figure 5:
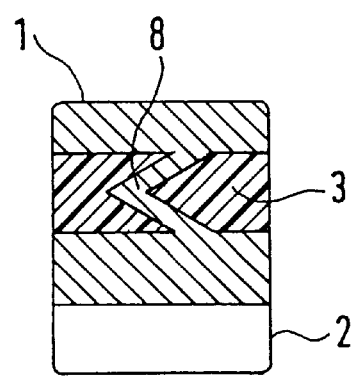
FIG. 5 is an elevation of a holding element with a V-shaped web in section.

FIG. 5 shows a further embodiment of a web 8. The web 8 is V-shaped in design. If several V-shaped webs 8 are provided, an alternating arrangement of the points is preferred.

For fastening the base part 1 on a carrier not shown in detail, the base part 1 has a recess 19 in which several barbs 20 are formed. The recess 19 serves to receive a known stud in which the barbs 20 engage.

An associated guide element 13, 14 which is connected to the strip 11 or 12 is provided for each respective holding element 9, 10. The guide element 13 or 14 is connected to the holding element 9 or 10 by tabs 21, 22. During the mounting process, the tabs are severed from the holding element 9 or 10 by a tool.

What is claimed:

1. A holding element for fastening at least one tubular component on a carrier, said holding element comprising:
   a base;
   a component support member;
   a damping element;
   a flexible web, said base and said support member being connected to one another by said flexible web, said damping element being arranged between said base and said support member, and said damping element being connected to said web; and
   projections inwardly extending into a component receiving cavity of said support member, said cavity being externally open substantially opposite a portion of said web.

2. A holding element as claimed in claim 1, wherein said damping element is connected to said portion of said web.

3. A holding element as claimed in claim 1, wherein said projections are flexible and substantially point toward said portion of said web.

4. A holding element as claimed in claim 1, wherein said damping element completely surrounds said web in the circumferential direction of said web.

5. A holding element as claimed in claim 1, wherein said damping element is made of a soft resilient plastics material.

6. A holding element as claimed in claim 1, wherein there are at least four of said projections in said cavity.

7. A holding element as claimed in claim 1, wherein said web extends obliquely between said base and said support member.

8. A holding element as claimed in claim 7, wherein at least one of said webs is V-shaped.

9. A holding element as claimed in claim 1, further comprising a second component receiving cavity located in said support member, and second flexible projections inwardly extending into said second cavity.

10. A holding element as claimed in claim 9, further comprising a stud receptacle located between said cavities, and at least one barb located in said stud receptacle.

11. A method of producing and using a holding element with a base part for application on a carrier, a support member for a component, at least one flexible web, and a damping element, the method comprising:
   (a) connecting the base part and the support member to one another by the at least one flexible web in which the base part, the support member and the at least one flexible web are initially produced in a single first injection molding operation;
   (b) subsequently producing the damping element in a second injection molding operation, the damping element being arranged between the base part and the support member and being connected to the at least one web; and
   (c) flexing a set of projections by inserting the circular component into the support member.

12. The method as claimed in claim 11, further comprising molding the damping element as a continuous member, substantially free of voids, substantially surrounding the at least one web.

13. A holding element belt system comprising:
   two strips;
   several spaced apart holding elements located between said two strips and extending substantially in parallel, each holding element further comprising a base part for application on a carrier, a support member for a component and a damping element; and a flexible web;

wherein said base part and said support member are connected to one another by said flexible web, said damping element is arranged between said base part and said support member, and said damping element is connected to said web.

14. A holding element belt as claimed in claim 13, wherein said strips are connected to said base part of each holding element.

15. A holding element belt as claimed in claim 13, wherein said base parts are connected to at least one guide element forming one of said strips.

16. A holding element, in particular for fastening at least one tubular component on a carrier, comprising a base part for application to the carrier, the support member for the component, and a damping element, said base part and said support member being connected to one another by a plurality of flexible webs said damping element being arranged between said base part and said support member, and said damping element being connected to at least one of said webs such that said at least one web is encapsulated inside of said damping element.

17. A holding element as claimed in claim 16, wherein at least two of said webs are orientated in opposite directions and extend obliquely.

18. A holding element as claimed in claim 16, wherein several of said webs are formed one behind the other and/or next to one another.

19. A holding element as claimed in claim 18, wherein the average distance between adjacent of said webs is equal.

20. A holding element comprising:

a base part;

a support member;

a damping element; and flexible webs;

wherein the base part and the support member are connected by the flexible webs, the damping element is arranged between the base part and the support member and is connected to the webs, and wherein at least one of the webs extends obliquely between the base part and the support member in a substantially straight line, a plurality of the webs are formed adjacent each other, the average distance between adjacent of the webs is substantially equal, and the base part and the support member consist of a plastic material which is harder than that of the damping element.

21. A holding element as claimed in claim 20, wherein said base, support member and webs are integral.

* * * * *